(12) United States Patent  (10) Patent No.: US 8,644,165 B2
Saarimaki et al.  (45) Date of Patent: Feb. 4, 2014

(54) METHOD AND APPARATUS FOR MANAGING DEVICE OPERATIONAL MODES BASED ON CONTEXT INFORMATION

(75) Inventors: Anssi Saarimaki, Berlin (DE); Daniel Seyde, Berlin (DE)

(73) Assignee: Navteq B.V., Veldhoven (NL)

( * ) Notice: Subject to any disclaimer, the term of this patent is extended or adjusted under 35 U.S.C. 154(b) by 312 days.

(21) Appl. No.: 13/099,651

(22) Filed: May 3, 2011

(65) Prior Publication Data

US 2012/0250517 A1  Oct. 4, 2012

Related U.S. Application Data

(60) Provisional application No. 61/469,999, filed on Mar. 31, 2011.

(51) Int. Cl.
 *H04L 12/26* (2006.01)
(52) U.S. Cl.
 USPC .......................... 370/241; 370/252; 709/224
(58) Field of Classification Search
 USPC .............. 370/241, 241.1, 242–245, 250, 252, 370/437, 465; 709/224–226
 See application file for complete search history.

(56) References Cited

U.S. PATENT DOCUMENTS

| 6,922,571 | B1 | 7/2005 | Kinoshita |
| 7,221,939 | B2 | 5/2007 | Ylitalo et al. |
| 7,565,230 | B2 | 7/2009 | Gardner et al. |
| 7,860,492 | B2 | 12/2010 | Bunte et al. |
| 7,987,463 | B2 * | 7/2011 | Kim et al. .................... 718/100 |
| 2002/0077144 | A1 | 6/2002 | Keller et al. |
| 2004/0252027 | A1 | 12/2004 | Torkkola et al. |
| 2005/0096842 | A1 | 5/2005 | Tashiro |
| 2007/0041552 | A1 | 2/2007 | Moscato |
| 2007/0201634 | A1 | 8/2007 | Bonnaud et al. |
| 2008/0103686 | A1 | 5/2008 | Alberth et al. |
| 2009/0055525 | A1 * | 2/2009 | Slepov et al. .................. 709/224 |
| 2009/0298482 | A1 | 12/2009 | Yen et al. |

(Continued)

FOREIGN PATENT DOCUMENTS

| EP | 0 638 887 A2 | 2/1995 |
| EP | 1298954 A1 | 4/2003 |

(Continued)

OTHER PUBLICATIONS

International Search Report for PCT/FI2012/050209 dated Jun. 11, 2012, pp. 1-5.

(Continued)

*Primary Examiner* — Kevin Mew
(74) *Attorney, Agent, or Firm* — Ditthavong Mori & Steiner, P.C.

(57) ABSTRACT

An approach is provided for managing device do-not-disturb operational modes based on context information. A do-not-disturb manager determines context information associated with a device, a user of the device, or a combination thereof. The do-not-disturb manager also processes and/or facilitates a processing of the context information to cause, at least in part, an activation of one or more operational modes of the device. The do-not-disturb manager also causes, at least in part, a disabling or enabling of one or more functions of one or more applications associated with the device based, at least in part, on the activated one or more operational modes.

18 Claims, 14 Drawing Sheets

(56) References Cited

U.S. PATENT DOCUMENTS

| | | | |
|---|---|---|---|
| 2010/0004005 A1 | 1/2010 | Pereira et al. | |
| 2010/0218104 A1* | 8/2010 | Lewis | 715/736 |
| 2010/0273443 A1 | 10/2010 | Forutanpour et al. | |
| 2010/0317371 A1 | 12/2010 | Westerinen et al. | |
| 2011/0202149 A1* | 8/2011 | Baier et al. | 700/83 |
| 2011/0222427 A1* | 9/2011 | Hjelm et al. | 370/252 |
| 2012/0011351 A1* | 1/2012 | Mundra et al. | 713/1 |
| 2012/0059843 A1* | 3/2012 | O'Donnell | 707/769 |
| 2012/0134287 A1* | 5/2012 | Turunen et al. | 370/252 |
| 2012/0159536 A1* | 6/2012 | Treacy et al. | 725/32 |
| 2012/0203491 A1* | 8/2012 | Sun et al. | 702/108 |
| 2012/0242648 A1* | 9/2012 | Baier et al. | 345/418 |
| 2012/0252425 A1* | 10/2012 | Moeglein et al. | 455/418 |
| 2012/0284713 A1* | 11/2012 | Ostermeyer et al. | 718/1 |
| 2012/0296452 A1* | 11/2012 | Baier et al. | 700/83 |
| 2012/0300758 A1* | 11/2012 | Turunen et al. | 370/338 |
| 2013/0121159 A1* | 5/2013 | Anthony et al. | 370/241 |

FOREIGN PATENT DOCUMENTS

| | | |
|---|---|---|
| EP | 1 445 925 A2 | 8/2004 |
| EP | 1 840 518 A2 | 10/2007 |
| EP | 2 136 345 A1 | 12/2009 |
| JP | 2004/20288 A | 1/2004 |
| JP | 2006-3171 A | 1/2006 |
| WO | WO 99/13668 A1 | 3/1999 |
| WO | WO 02/39761 A2 | 5/2002 |
| WO | WO 2008/109477 A1 | 9/2008 |
| WO | WO 2009/064132 A2 | 5/2009 |
| WO | WO 2010/045975 A1 | 4/2010 |
| WO | WO 2010/111123 A2 | 9/2010 |

OTHER PUBLICATIONS

Siewiorek, D., "SenSay: A Context-Aware Mobile Phone", Carnegie MellonUniverstiy, Human Computer Interaction Institute and Institute for Complex Engineered Systems, Pittsburg, U.S.A., Dec. 14, 2003, pp. 1-10.

Written Opinion for PCT/FI2012/050209 dated Jun. 11, 2012, pp. 1-9.

Nguyen, T., et al. "Peer-to-Peer Context Information Management for Spontaneous Networks" Institut TELECOM, pp. 1-9, http://conferences.telecom-bretagne.eu/data/asn-symposium/actes/Poster__Nguyen.pdf.

Richtel, M. "A Short-Circuit to Distracted Driving," The New York Times, Jan. 20, 2011, pp. 1-3 (http://www.nytimes.com/2011/01/21/technology/21distracted.htm?_r=2&pagewanted=print).

* cited by examiner

METHOD AND APPARATUS FOR MANAGING DEVICE OPERATIONAL MODES BASED ON CONTEXT INFORMATION

RELATED APPLICATIONS

This application claims the benefit of the earlier filing date under 35 U.S.C. §119(e) of U.S. Provisional Application Ser. No. 61/469,999 filed on Mar. 31, 2011, entitled "Method and Apparatus for Managing Device Operational Modes Based on Context Information," the entirety of which is incorporated herein by reference.

BACKGROUND

Service providers and device manufacturers (e.g., wireless, cellular, etc.) are continually challenged to deliver value and convenience to consumers by, for example, providing compelling network services. With the ready availability of such devices, modern consumers often carry at least one, if not more communication devices throughout the day. As a result, many consumers are essentially reachable by some form of communication device around the clock, whether they are at home, work, school, a library, movies, restaurants, etc. Of particular concern is the potential for the distraction of consumers as a result of their communication device when they are in a situation that otherwise requires no distraction, such as driving a car or motorcycle, riding a bike, flying a plane, etc. Balanced with this concern is the concern over other parties being unable to communicate with the consumers during a situation that requires no distraction; such other parties are therefore left unaware of why the consumers are not responding. As such, device manufacturers face significant technical challenges to providing mechanisms that prevent distractive communications while still maintaining some level of communication.

SOME EXAMPLE EMBODIMENTS

Therefore, there is a need for an approach for managing device do-not-disturb operational modes based on context information.

According to one embodiment, a method comprises determining context information associated with a device, a user of the device, or a combination thereof. The method also comprises processing and/or facilitating a processing of the context information to cause, at least in part, activation of one or more operational modes of the device. The method further comprises causing, at least in part, disabling or enabling of one or more functions of one or more applications associated with the device based, at least in part, on the activated one or more operational modes.

According to another embodiment, an apparatus comprises at least one processor, and at least one memory including computer program code, the at least one memory and the computer program code configured to, with the at least one processor, cause, at least in part, the apparatus to determine context information associated with a device, a user of the device, or a combination thereof. The apparatus is also caused to process and/or facilitate a processing of the context information to cause, at least in part, activation of one or more operational modes of the device. The apparatus is further caused to cause, at least in part, disabling or enabling of one or more functions of one or more applications associated with the device based, at least in part, on the activated one or more operational modes.

According to another embodiment, a computer-readable storage medium carries one or more sequences of one or more instructions which, when executed by one or more processors, cause, at least in part, an apparatus to determine context information associated with a device, a user of the device, or a combination thereof. The apparatus is also caused to process and/or facilitate a processing of the context information to cause, at least in part, activation of one or more operational modes of the device. The apparatus is further caused to cause, at least in part, disabling or enabling of one or more functions of one or more applications associated with the device based, at least in part, on the activated one or more operational modes.

According to another embodiment, an apparatus comprises means for determining context information associated with a device, a user of the device, or a combination thereof. The apparatus also comprises means for processing and/or facilitating a processing of the context information to cause, at least in part, activation of one or more operational modes of the device. The apparatus further comprises means for causing, at least in part, disabling or enabling of one or more functions of one or more applications associated with the device based, at least in part, on the activated one or more operational modes.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for managing device do-not-disturb operational modes based on context information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are discussed with respect to do-not-disturb modes, it is contemplated that any operation mode of the device (e.g., a mode to generate alerts or provide for availability of additional functions).

Figure 1:
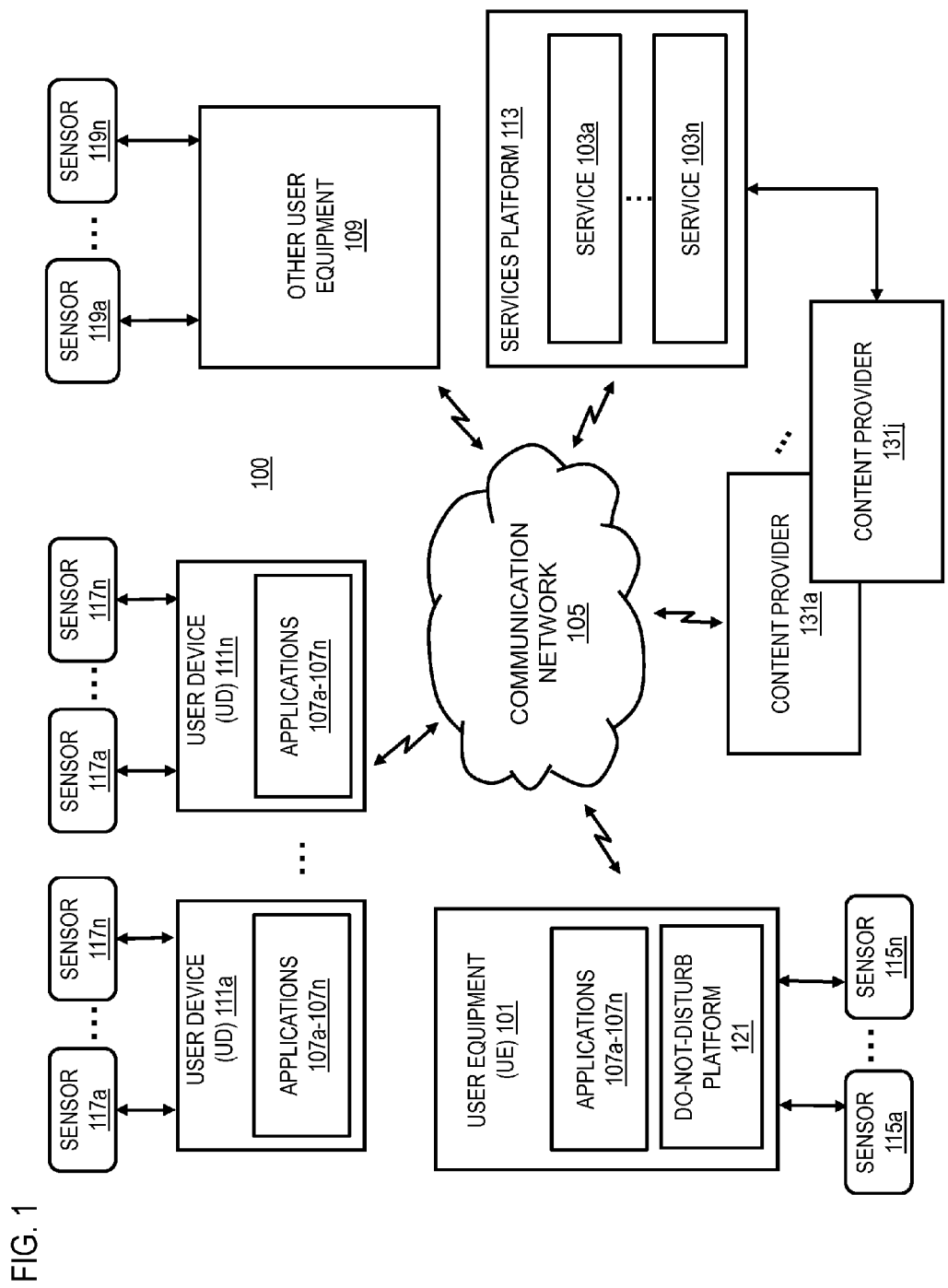
FIG. 1 is a diagram of a system capable of managing device do-not-disturb operational modes based on context information, according to one embodiment.

FIG. 1 is a diagram of a system capable of managing device do-not-disturb operational modes based on context information, according to one embodiment. As previously noted, as communication devices become more engrained in daily work and life, consumers are subject to increasing numbers of potential disruptions from communications that are received regardless of location, time and/or activity. For example, a user may be driving a car, riding a bike, flying a plane, etc., when a communication (e.g., a phone call, e-mail, SMS, MMS, social media communication, etc.) is received at the user device. During some activities, even the slightest distraction can have negative effects. For example, more countries are outlawing merely touching a cell phone while driving a vehicle. These strict laws are in response to an increasing number of traffic accidents caused by cell phone related distracted driving. The laws outlawing merely touching a cell phone while driving emphasize that even the slightest distraction in the right situation can lead to an accident. The laws also emphasize that operating a vehicle safely is the primary responsibility of the driver and that using a communication device while driving should be limited, if allowed at all. Thus, in countries with such strict laws, even a small distraction, such as an appointment reminder, could lead to touching a cell phone and breaking the law.

Turning off the devices is one way of dealing with the potential for distractions. However, with the increasing functionality of the devices, consumers often find themselves using their communication devices less for communication and more for other functions (e.g., navigating, reading books, reading news, watching weather reports, etc.). Further, simply turning off the devices makes the user completely unavailable. Some of those wanting to reach the user would appreciate more information regarding why the user is unavailable and when to reach the user in the future. Thus, managing the level of distractions of a user during activities that require little to no distractions, while at the same time updating the activity of the user to third parties requires complex measures.

To address this problem, a system 100 of FIG. 1 introduces the capability to manage device operational modes (e.g., do-not-disturb modes) based on context information and respond to incoming communications accordingly to keep third parties informed without causing distractions. The system 100 also introduces the capability to manage device operational modes based on context information to limit the functionality of the device on the user end, regardless of incoming communications. In one embodiment, the system 100 provides for a method of activating and/or controlling one or more levels of a do-not disturb (DnD) mode for in-vehicle use of a mobile phone based, at least in part, on contextual triggers in a mobile device. For example, the mode switching is performed in order to preserve the primary task, which in this example is to drive a vehicle safely. As noted above, the different modes may be specified for different activities or task performed while using the device. In some embodiments, the system 100 enables users, service providers, and the like to define (1) the different DnD modes, and (2) the contextual triggers that switches the phone between these modes.

By way of example, with respect to applying DnD modes to in-vehicle (e.g., in-car) use, different modes may include, for instance: (1) DnD Mode 1: block all function of the mobile phone; (2) DnD Mode 2: allow only content or applications that have drive safe modes or functions (e.g., applications certified as car safe); (3) DnD Mode 3: allow low disturbance events (e.g., simple events requiring no user response); (4) DnD Mode 4: allow medium disturbance content (e.g., complex textual events spoken to user with text-to-speech synthesizer lasting over 3 seconds); and/or (5) DnD Mode 5: allow all content or functions (e.g., no restrictions on what disturbance content is blocked).

By way of example, with respect to applying DnD modes to in-vehicle use for limiting user functionality of the mobile phone, regardless of incoming messages, the different modes discussed above may limit the functionality according to: (1) DnD Mode 1: block all user functionality of the mobile phone; (2) DnD Mode 2: allow user functionality of only content or applications that have drive safe modes or functions; (3) DnD Mode 3: allow low disturbance functionality (e.g., playing music through the car stereo with the mobile phone or using voice operated functionality); (4) DnD Mode 4: allow medium disturbance functionality (e.g., using a navigation application that requires minimal user action to provide a navigation route); (5) DnD Mode 5: allow all functionality (e.g., no restrictions on what application or functions are available to the driver).

In one embodiment, the contextual triggers for the DnD modes are based, at least in part, on one or more parameters such as local regulatory restrictions (e.g., a jurisdiction bans use of phone functions while driving), environmental factors (e.g., weather, road conditions, traffic, type of road, etc.), cognitive load on the driver or user, and the like. Examples of user interactions under the scenarios of different DnD modes are briefly discussed below.

In one embodiment, the user receives on a user device one or more disturbance events from one or more sources but is in a context that prohibits all disturbance events; subsequently the user device blocks the incoming events and generates an automated message. Upon a change in the context, the user device informs the user of the blocked events.

In one embodiment, the user receives on a user device one or more disturbance events from one or more sources but is in a context that allows some notification of the events to the user while limiting further response; subsequently the user device passes events of minimal distraction to the user and blocks events of greater distraction, and responds to the events of greater distraction with an automated message. Upon a change in the context, the user device informs the user of the incoming events.

In one embodiment, the user receives on a user device one or more disturbance events from one or more sources and is in a context that allows all notifications of the events; subsequently the user device passes all of the events to the user, regardless of the level of distraction of the events.

In one embodiment, the user receives on a user device one or more disturbance events from one or more sources but is in a context that prohibits all events while using an application associated with the device; subsequently the user device blocks the incoming events and responds with an automated message that includes relevant information regarding the status of the user based on the application. Upon a change in the context, the user device informs the user of the blocked events and the relevant information forwarded in the message.

In one embodiment, the user receives on a user device one or more communications from one or more sources but is in a context that prohibits all communications while using an application associated with the device; subsequently the user device blocks the incoming communications and responds with an automated message that includes relevant information from the application. Despite no change in the context, after a threshold period of time, the user device informs the user of the incoming communications and the lapse of the threshold period of time since the message was sent for the user to decide whether to act on the communication.

In one embodiment, the user is in a context that prohibits all disturbance events but the context information of the user changes without a change in the prevention of distractions; subsequently the user device forwards automated messages to certain individuals associated with the user regarding the change in the context, updates the operational mode based on the change in context information, and notifies the user of any previously blocked disturbance events based on the previous context information and operational mode. For example, the user is driving and crosses state lines; subsequently the user device updates friends of the user on social networking sites that the user crossed state lines to update the friends of the user's location. Additionally, if the new state has less strict laws regarding distracted driving, such that the operational mode changes to allow more distractions, the user device updates the user of any previous disturbance events that were blocked while in the previous state that would no longer be blocked based on the current state's less strict laws.

As shown in FIG. 1, the system 100 includes user equipment (UE) 101 with connectivity for communication with one or more other user equipment (OUE) 109 and user devices (UD) 111a-111n (collectively known as user device (UD) 111) over a communication network 105 while possibly involved in certain activities that require no distraction. User equipment 101 and user devices 111 may execute one or more applications 107a-107n (also collectively known as applications 107), for example one or more mapping applications, messaging applications, calendar applications, context applications, sensor applications. The UE 101 includes a do-not-disturb (DnD) platform 121 for managing the UE 101 do-not-disturb modes. Sensors 115a-115n (collectively known as sensors 115) associated with the UE 101 acquire information regarding the context of the user and the UE 101. Sensors 117a-117n (collectively known as sensors 117) associated with the UD 111 acquire information regarding the context of the user and the UD 111. Sensors 119a-119n (collectively known as sensors 119) associated with the OUE 109 collect information regarding the context of another user and the OUE 109. The services platform 113 can provide one or more services 103a-103n (collectively known as services 103) (e.g., location based services, mapping information, social networking services, etc.) to one or more users. The UE 101 also has connectivity one or more content providers 131a-131j via the communication network 105.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 and OUR 109 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the UD 111, the 109, and the services platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
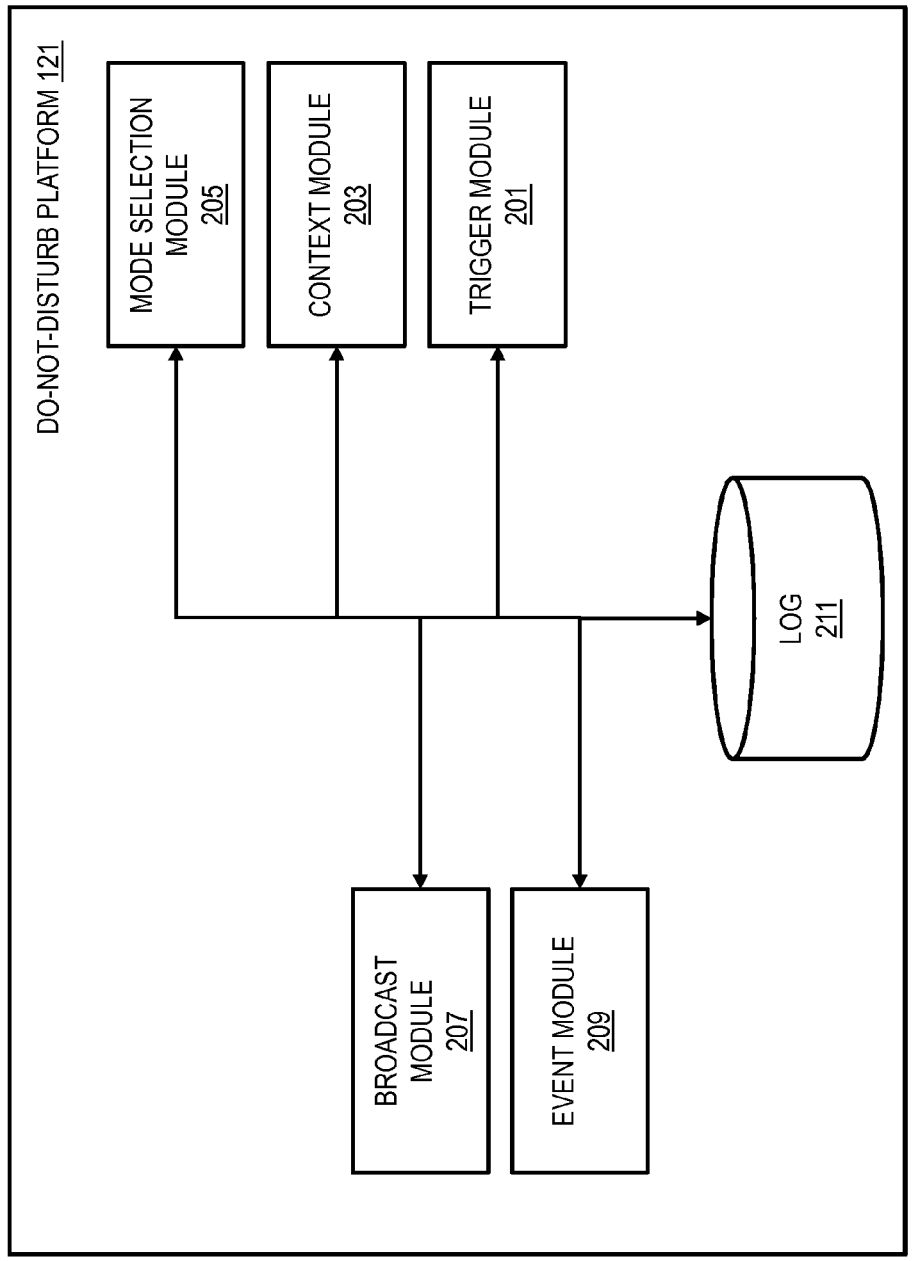
FIG. 2 is a diagram of the components of the do-not-disturb platform 121, according to one embodiment.

FIG. 2 is a diagram of the components of a DnD platform 121, according to one embodiment. By way of example, the DnD platform 121 includes one or more components for providing managing device do-not-disturb operational modes based on context information. It is contemplated that the functions of these components may be combined in one or more components or performed by other components of equivalent functionality. In this embodiment, the DnD platform 121 includes at least a trigger module 201, a context module 203, a mode selection module 205, a broadcast module 207, an event module 209, and a log 211.

As shown in FIG. 2, the DnD platform 121 includes a trigger module 201 that communicates with the sensors 115 of the UE 101 to determine the state of each one of the sensors 115. In one embodiment, the trigger module 201 further communicates with the applications 107 of the UE 101 to determine the state of functions of the applications 107. In one embodiment, the trigger module 201 further communicates with the sensors 117 of the UD 111 to determine the state of the sensors 117. The trigger module 201 further communicates with the applications 107 of the UD 111 to determine the state of functions of the applications 107. In one embodiment, the trigger module 201 further communicates with the sensors of the OUE 109 to determine the state of the sensors 117.

The applications 107 running on the UE 101 and the UD 111 can include various types of applications concerning many types of information (e.g., navigation, weather/environmental, traffic, special events, country data, etc.). The sensors for the UE 101, UD 111, and the OUE 109 can collect any type of information depending on the type of sensor. For example, UE 101 sensors 115 can include accelerometers, gyroscopes, brightness sensors, moisture sensors, load sensors, slope sensors, visibility sensors, etc. The UD 111 sensors 117 can include all of the functionality of the sensors found in the UE 101. In addition, UD 111 sensors 117 can include device specific sensors, such as speedometer for automobiles or motorcycles, altimeters for aircraft, etc. Thus, the trigger module 201 communicating with sensors 115, sensors 117, and sensors 119 can generate a wide array of information used by the DnD platform 121. Each piece of information acquired from sensors and applications is context information the trigger of which is determined by the sensors and applications.

As shown in FIG. 2, the DnD platform 121 further includes a context module 203 for determining context information of the user equipment 101. The context module 203 communicates with the trigger module 201 to collect all of the context information of the sensor readings from the various sensors of the system 100 and the functions from the various applications. By collecting the sensor readings, the context module 203 determines context information of the system, generally, and for each specific device, specifically.

As shown in FIG. 2, the DnD platform 121 further includes a mode selection module 205 for determining an operational mode for the user equipment 101. Based on the determined context information communicated from the context module 203, the mode selection module 205 sets a parameter that indicates an operational mode for the applications 107 on the UE 101. The mode selection module 205 compares the context information from the context module 203 with stored principles that relate the context information to the various operational modes of the mode selection module 205. In one embodiment, the mode selection module 205 sets an operational mode of the DnD platform 121 for the UE 101 between two modes. In one embodiment, the mode selection module 205 sets an operational mode of the DnD platform 121 for the UE 101 between five operational modes. However, the mode selection module 205 is not limited in the number of modes to select between depending of the intended purpose of the do-not-disturb platform 121 or the UE 101.

As show in FIG. 2, the DnD platform 121 further includes a broadcast module 213 for generating broadcast information associated with the user equipment 101 based on the operational mode, the context information, or a combination thereof. Upon generating the broadcast information, the broadcast module 213 distributes the broadcast information to the communication network 105 for distribution to the other user equipment 109 and/or the service platforms 113. In one embodiment, the broadcast module 207 can generate and broadcast information in response to a change in the context information. In one embodiment, the broadcast module 207 can generate and broadcast information in response to an event at the UE 101, discussed below. In one embodiment, the broadcast module 207 can generate and broadcast information in response to a change in the operational mode of the mode selection module 205.

As shown in FIG. 2, the DnD platform 121 further includes an event module 209. The event module 209 monitors for incoming disturbance events to the UE 101 and the DnD platform 121. The event module 209 interacts with the log 211 to log information regarding the incoming events. The event module 209 can also interact with the log 211 and broadcast module 207 to log information regarding broadcast information that is sent by the broadcast module 207.

Figure 3:
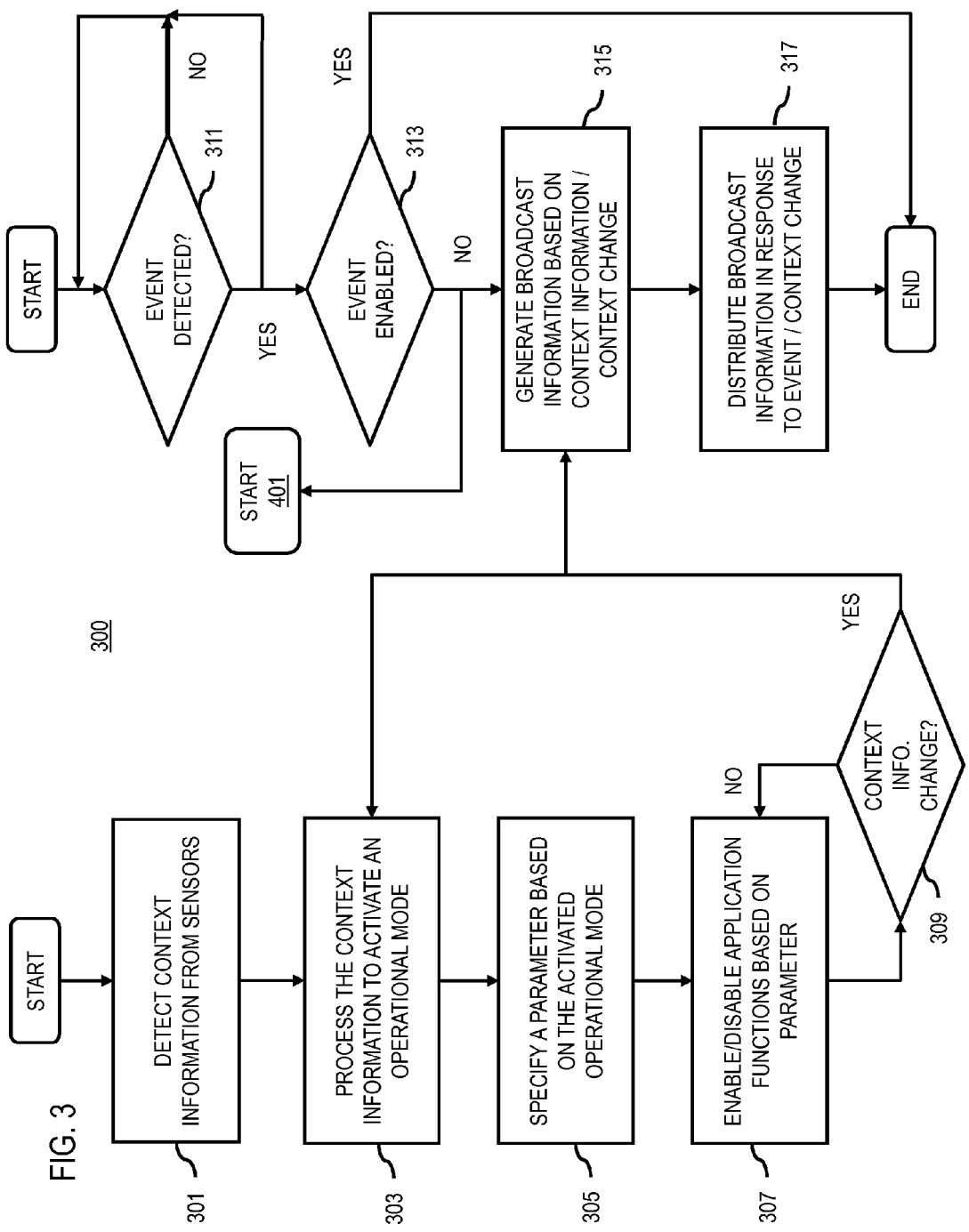
FIG. 3 is a flowchart of a process for managing device do-not-disturb operational modes based on context information and generating broadcast information, according to one embodiment.
Figure 13:
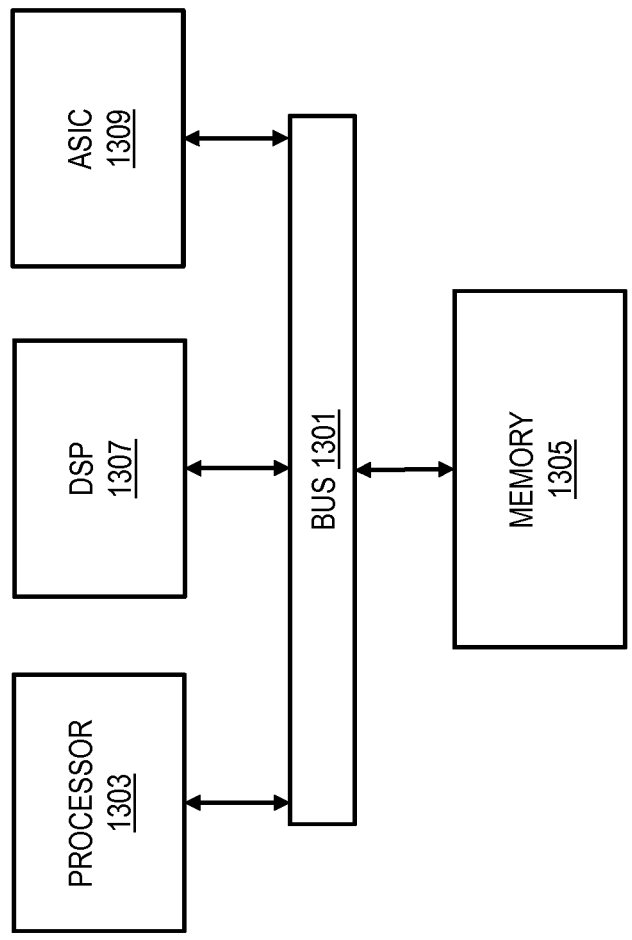
FIG. 13 is a diagram of a chip set that can be used to implement an embodiment of the invention.

FIG. 3 is a flowchart of a process for managing device do-not-disturb operational modes based on context information, according to one embodiment. In one embodiment, the DnD platform 121 performs the process 300 and is implemented in, for instance, a chip set including a processor and a memory as shown in FIG. 13. The process 300 provides a general overall process for providing managing device do-not-disturb operational modes based on context information and generating broadcast information, which is discussed in more detail with respect to FIGS. 5-8. In step 301, the DnD platform 121 acquires context information from at least one sensor of the sensors 115 of the UE 101. For example, the sensors 115 trigger in response to a change in context information. In one embodiment, the DnD platform 121 further acquires context information from at least one application 107 of the UE 101. In one embodiment, the DnD platform 121 acquires information from the sensors 117 of the UD 111, and the sensors 119 of the OUE 109. As discussed above, the sensors 115, 117, and 119 can detect a wide range of information, including velocity, acceleration, proximity, location, heading, etc. The sensors of the UD 111 also can have more varied or more tailored sensory functions according to the specific type of UD 111 device. In one example, the UD 111 is an automobile and the sensors 117 detect fuel level, oil level, battery level, wiper fluid level, valve timing, etc. In one embodiment, the sensors of the UD 109 can detect weather, traffic, special event information, etc. at a remote location that the DnD platform 121 detects as context information.

In step 303, the DnD platform 121 processes the context information acquired in step 301 according to certain principles to determine the appropriate operational mode to apply for the UE 101. In one embodiment, the DnD 121 has five operational modes 1-5, with 1 being the most restrictive operational mode and 5 being the least restrictive operational mode. When the DnD 121 platform compares the context information to the principles, multiple operational modes can be satisfied with same context information. In one embodiment, the most restrictive operational mode is set as the controlling operational mode.

For example, in one embodiment the UE 101 is a cell phone and the UD 111 is a car in communication with the cell phone. Sensors on both the car and the cell phone provide context information to the DnD platform 121. In one embodiment, the speed of the car, the level of in the gas tank of the car, the level of charge left in the battery of the car, a detection of an imminent impact, etc. can represent context information received and processed by the DnD platform 121. In one embodiment, whether the cell phone is currently communicating, whether a navigation application is running with or without a route and includes map data, whether a traffic application is running, etc. can represent context information generated from the cell phone. While some or all of the context information relate individually or together with principles in determining the operational mode, the detection of an imminent impact, for example, can be associated with a principle that makes this context information precedence over all context information. Further, although the described context information satisfy multiple operational modes, the precedence of the imminent crash detection resulting in activating the most strict operational mode takes precedence over all of the other operational modes.

The following description is merely for informative values only and in no way limits the system 100 to the specifics of the embodiment. In one embodiment, where the UE 101 is a cell phone and the UD 111 is a car, the operational modes can be broken down as follows.

Operational mode 1 can be the most restrictive mode that blocks all incoming disturbance information. The operational mode can be satisfied by, for example, any of the context information satisfying any one of the following principles: legislation with zero tolerance of cell phone usage while operating a car and the phone is connected to the car (by e.g., Bluetooth, USB, WiFi, etc.); parental control settings; an alert from the car that there is an imminent accident; settings defined by an employer for cell phones used by employees; settings defined by the primary owner for cell phones used by third parties; settings enforced by the phone operator; or information from the car regarding speed or breaking exceeding a certain level.

Operational mode 2 can be the second most restrictive mode that blocks all non-car safe applications from running functions on the cell phone (discussed in detail below). The operational mode can be satisfied by, for example, any of the context information satisfying any one of the following principles: the cell phone is connected to the car and the car sets the operational mode; the cell phone is connected to the car and the car is moving; or the cell phone is connected to the car and the speed of the car exceeds a threshold limit as determined by an application running on the cell phone, sensors on the cell phone, or sensors on the car.

Operational mode 3 can be the third most restrictive mode that blocks all applications from running functions on the cell phone that would generate a disturbance other than a low audible sound. The operational mode can be satisfied by, for example, the context information satisfying the following principles: the cell phone drive navigation is active with an active route, the phone is not connected to the car and speed from the internal GPS of the cell phone is over a threshold limit.

Operational mode 4 can be the second least restrictive mode that blocks only the highest disturbance events, such as a lengthy incoming text message. For example, the actual complex textual events could be blocked but the message could be spoken to the user with a text-to-speech synthesizer, which would be less distracting than the user reading the lengthy text message. The operational mode can be satisfied by, for example, the context information satisfying the following principles: the cell phone drive navigation is active with an active route but the user has stopped, the phone is not connected to the car and speed from the internal GPS of the cell phone is below a threshold limit.

Operational mode 5 can be the least restrictive mode that does not block any incoming disturbance content. The operational mode can be satisfied when none of the other four modes are satisfied.

In step 305, the DnD platform 121 sets a parameter based the activated operational mode that the applications 107 access to determine the functionality of each application to enable or disable on the user end and what content distractions are blocked and what are passed to the UE 101 user interface. In step 307, the specific applications 107 enable or disable the functionality and blocking of distractions based on the set parameter to control the level of functionality of the UE 101 and disturbance of the user.

In step 309, the DnD platform 121 monitors the context information for any change that may affect the operational modes. In one embodiment, the DnD platform 121 detects a change in context information that, when compared to the principles, increases the operational mode to a more restricting level. In one embodiment, the DnD platform 121 detects a change in the context information that, when compared to the principles, decreases the operational mode to a less restricting level.

In step 309, when there is no change in the context information, the DnD platform 121 continues to enable or disable functions of the applications 107 based on the previous operational mode and set parameter. In step 309, when there is a change in the context information, the DnD platform 121 proceeds to update the context information and proceed to step 315, discussed below.

In step 311, which is run concurrently with the previous steps, the DnD platform 121 detects if there is also event associated with the UE 101. In one embodiment, an event associated with the UE 101 is incoming disturbance content. In one embodiment, the incoming disturbance content is a phone call. In another embodiment, the incoming disturbance is a SMS. In one embodiment, the event is an internal disturbance event such as an appointment alert from a calendar application running on the UE 101. In one embodiment, the disturbance content is a traffic report or weather report from navigation or weather applications, respectively. In another embodiment, the incoming disturbance is an e-mail. In one embodiment, the incoming disturbance is from the OUE 109. In one embodiment, the incoming disturbance is from one service 103 of the services platform 113. In one embodiment, the incoming disturbance is from one or more functions running in one or more applications on the UE 101 or the UD 111. However, the incoming disturbance content is not limited to the above disturbances nor limited to the above disturbance sources but can be any form of disturbance at the UE 101 from any source.

If a disturbance event is not detected in step 311, the process 300 continues monitoring for events through the DnD platform 121 with the event module 209. If a disturbance event is detected, the process 300 continues to step 313.

In step 313, the disturbance event is determined as to whether the disturbance content satisfies the current operational mode (i.e., the disturbance content is less than the disturbance limit). If the disturbance content satisfies the current operational mode (i.e., the content is associated with a function of an application that is enabled), the disturbance content proceeds through the UE 101 in a normal manner (i.e., appointment reminder message appears with an audible response, etc.). If the disturbance content does not satisfy the current operational mode (i.e., the content is associated with a function of an application that is disabled), the process 300 continues to step 315, and step 401 of process 400 discussed below.

In step 315, the DnD platform 121 generates broadcast information with the broadcast module 207. The broadcast information that is generated depends on the type of context information that is available and why the broadcast information is being generated. In one embodiment, the broadcast information is generated in response to a detected event from step 311 from a third party using OUE 109 who is attempting to contact the user of the UE 101. In this embodiment, for example, if context information is present that indicates the user is traveling to Chicago and will arrive in about 15 minutes, the broadcast information includes this information to update the potential third party that is attempting to communicate with the user of the UE 101.

In another embodiment, the broadcast information is generated in response to a change in the context information from step 309. For example, the user of the UE 101 may have the DnD 121 configured to generate broadcast information proactively in the event of a certain triggers or context information occurring. Thus, when the context information changes in a way that satisfies the rules for generating broadcast information, the broadcast information module generates broadcast information that contains the pertinent information. In one example, the broadcast information includes navigation information such as a point of interest the user of the UE 101 has just passed. In this embodiment, third parties are updated with information regarding the user proactively.

In another example, broadcast information is generated in response to context information changing that, when compared to the principles, causes a change in the operational mode to be in place. Thus, the broadcast information includes information regarding the recently activated operational mode. After generating the broadcast information the process 300 continues to step 317.

In step 317, the generated broadcast information is sent to the various designated sources. In one embodiment where a third party using an OUE 109 had their communication blocked, the broadcast information is sent to the third party OUE 109. In one embodiment where broadcast information is proactively generated in response to a change in context information, the broadcast information is proactively sent to OUE 109 in various forms (e.g., SMS, MMS, e-mail, text-to-speech, etc.) or the services platform 113 where it is broadcasted to various services (e.g., social networking sites, blogs, etc.). In one embodiment where the broadcast information is generated in response to a change in context information causing a change in the operational mode of the DnD platform 121, the broadcast information is sent to the UE 101 to inform the user of the change in the operational mode. After the broadcast information is sent, the process continues to monitor for changes in the context information or for the occurrence of events.

Figure 5:
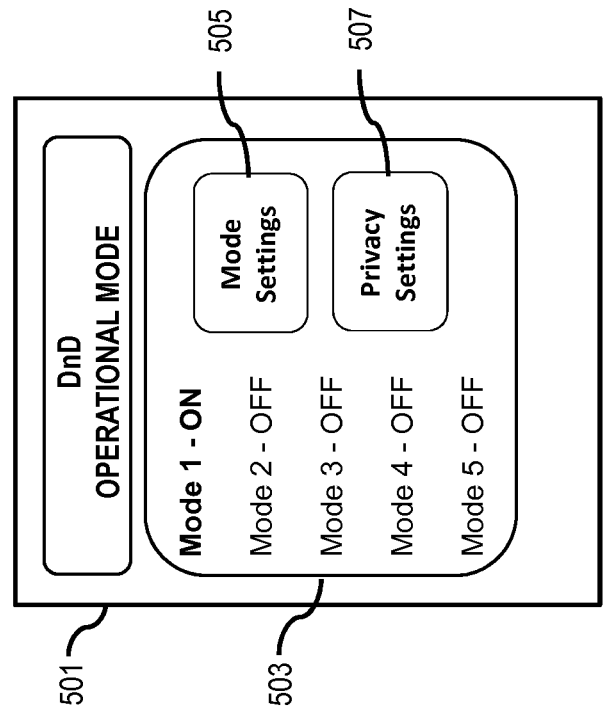
FIG. 5 is a diagram of a user interface utilized in the process of FIG. 3, according to various embodiments.

FIG. 5 is a diagram of a user interface 501 utilized in the process of FIG. 3, according to one embodiment. The user interface 501 includes an indicator 503 of the various operational modes that are possible for the specific DnD platform 121. In one embodiment, when the UE 101 changes into a different operational mode, the user interface 501 displays the indicator 503 of the presently activated operational mode. In another embodiment, the user interface 501 displays the indicator 503 that displays all of the possible operational modes and distinguishes one over the other. For example, the indicator 503 bolds the activated mode (Mode 1), and can further have the mode in a different color than non-activated modes (Modes 2-5) for a user to more easily see the current operational mode of the UE 101. In one embodiment, the DnD platform 121 could also cause the UE 101 to play a sound each time the operational mode switches to a different mode. In one embodiment, the DnD platform 121 could also cause the UE 101 to play a unique sound for each one of the five operational modes. Alternatively, in one embodiment, the DnD platform 121 could cause the UE 101 to play a unique sound for any operational mode that limits certain features. For example, the DnD 121 causes a distinct sound to be played any time an operational mode activates that prevents audible communications and causes a different distinct sound to be played any time an operational mode activates that does not prevent audible communications.

The user interface 501 also includes indicator 505 that allows the user to change the settings of the different operational modes. In one embodiment, accessing indicator 505 allows the user of the UE 101 to change the settings, principles, and/or parameters of the operational modes according to certain preferences. In another embodiment, accessing indicator 505 allows the user of the UE 101 to change the settings, principles, and/or parameters of the operational modes according to certain allowed preferences that do not conflict with other default settings (e.g., operational mode principles that are based on law that cannot be modified). The user interface 501 also includes indicator 507 that allows a user to change privacy settings for how the DnD platform 121 responds to certain disturbance content or events that involve a third party. In one embodiment, the user of the UE 101 can adjust the broadcast information sent to different third parties based on privacy settings. For example, the user can distinguish between different types of third parties and certain information that is generated and distributed to the types of third parties by the broadcast module 207. In one embodiment, for example, the user of the UE 101 can establish rules using the privacy settings to distinguish between known third parties attempting to communicate with the UE 101 and unknown third parties attempting to communicate with the UE 101. In this respect, the user can modify the DnD platform 121 to not give out sensitive information regarding, for example, the location of the user, the destination of the user, the estimated time of the destination of the user, etc. to unknown third parties.

Figure 6:
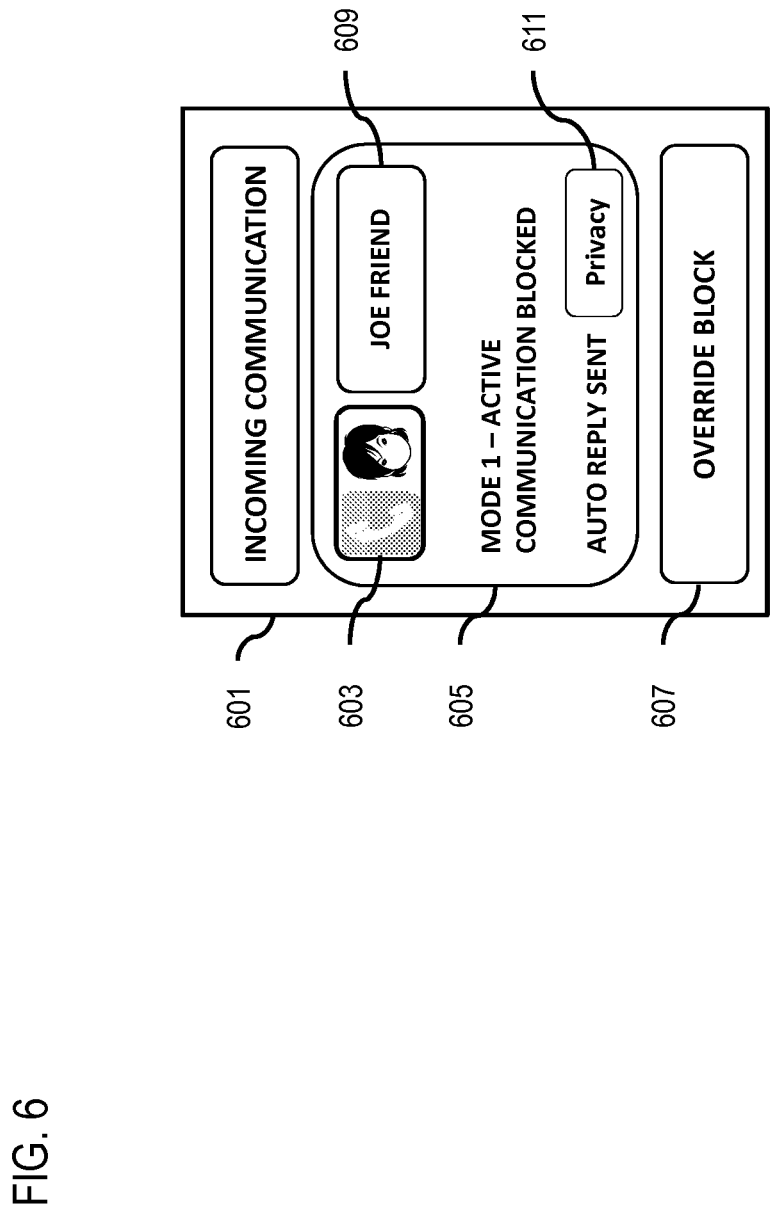
FIG. 6 is a diagram of a user interface utilized in the process of FIG. 3, according to various embodiments.

FIG. 6 is a diagram of a user interface 601 utilized in the process of FIG. 3, according to one embodiment. In one embodiment, the user interface 601 includes indicator 605 that indicates the specific time of a disturbance event. In one embodiment, the user interface 601 indicates through indicator 605 that the UE 101 is receiving an incoming phone call by indicator 603. The user interface 601 also includes indicator 609 that indicates the third party that is calling. Indicator 605 also indicates what operational mode is currently active. In one embodiment, because the UE 101 is currently in operational mode 1, which blocks all incoming content, the indicator 605 indicates that the phone call is blocked and an auto reply has been sent to the third party, discussed in more detail below. In one embodiment, the user interface 601 includes an indicator 611 that allows the user of the UE 101 to modify the privacy settings associated with the auto reply in the same way as discussed above regarding the privacy settings indicator 507. In one embodiment, the user can establish privacy settings for each individual third party to control whether the third party will receive broadcast information and the level of detail of the broadcast information. For example, the user can set the UE 101 to broadcast detailed information to the user's wife, such as the estimated time to arrival to a destination, and not to other third parties. In one embodiment, the user can set the UE 101 to distribute a certain level of broadcast information to third parties designated as family, different broadcast information to third parties designated as friends, and different broadcast information for all other designation of contacts. In one embodiment, the settings for third parties and broadcast information will be set before disturbance events and the indicator 611 will allow the user to modify individual third party privacy settings dynamically upon receiving a communication from the party. Further, in one embodiment, for additional safety the user interface 601 includes indicator 607 that allows the user to override the operational mode that blocks the incoming disturbance content. In one embodiment, the override indicator 607 allows the user to override the current operational mode prior to an auto reply message being sent in order to respond to the disturbance content. In another embodiment, the override indicator 607 allows the user to override the current operational mode after an auto reply message is sent if, for example, the user determines the blocked content was important and should be answered despite being properly blocked.

Depending on which operational mode is activated when the incoming content is received, indicator 605 displays different information. For example, in one embodiment, there are five operational modes. In one embodiment, the most restrictive operational mode causes all incoming disturbance content to be blocked. In one embodiment, the second most restrictive operational mode indicates whether the disturbance content is from an approved application and disables or enables the content appropriately. For example, in one embodiment the UE 101 is a cell phone and the disturbance content is an appointment reminder that originated from a calendar application 107. Because the calendar application is an approved application, the appointment reminder is not disabled and allowed to be displayed on the cell phone. In one embodiment, the third most restrictive operational mode indicates incoming disturbance content without the need for user action with a low audible event. For example, in the third most restrictive operational mode, even if the calendar application is not an approved application, an appointment reminder merely requires a low audible event so the DnD platform 121 does not cause to disable the appointment reminder. In one embodiment, the second least restrictive operational mode will convert otherwise disruptive incoming content into a less disruptive format. For example, an incoming SMS message is converted to speech using text-to-speech functionality. Thus, although reading a SMS message can be highly distracting while driving, reading the SMS message audibly by the UE 101 is less distractive and allows the user of the UE 101 to receive the message. In one embodiment, the least restrictive operational mode does not disable any functionality of the UE platform 121.

Figure 7:
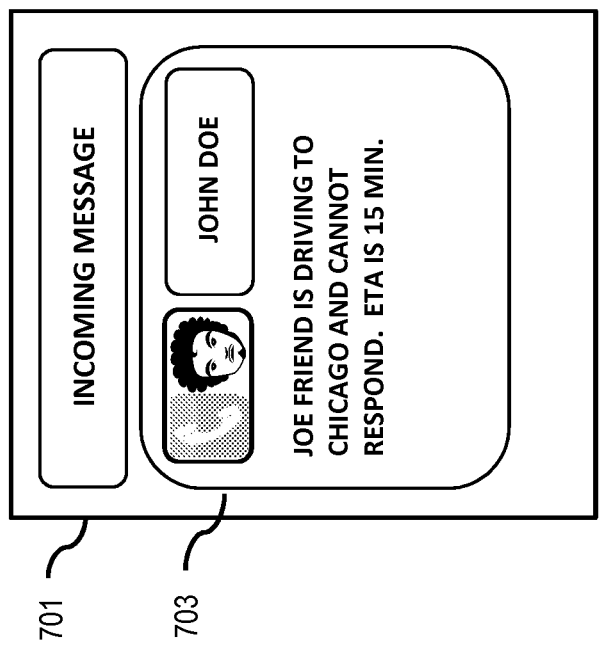
FIG. 7 is a diagram of a user interface utilized in the process of FIG. 3, according to various embodiments.

FIG. 7 is a diagram of a user interface 701 of an OUE 109 utilized in the process of FIG. 3, according to one embodiment. The user interface 701 is an example of the user interface of the OUE 109 after receiving an auto-reply message from the UE 101 that contains broadcast information from the broadcast module 207, as discussed above. Indicator 703 indicates that the broadcast information informs third parties of various information regarding the status of the user of the UE 101. In one embodiment, the user is using the UE 101 for running a navigation application 107 with active route guidance. The active route has a destination—Chicago—and an estimated time of arrival to the destination—15 min. Thus, in response to an incoming disturbance event being blocked by the DnD platform 121, the broadcast module 207 distributes specific information to third parties regarding where the user is heading and when the third party can expect the user to be able to communicate. With an active navigation route, the broadcast information can include, arrival time and destination, arrival time to a stopover, current location/speed/heading, distance to next stopover or destination, the last stop time, etc. By including the sensors 115, 117 and 119 discussed above, and analyzing the information from applications 107 running on UE 101 and UD 111, the options for the specific type of broadcast information are limitless. In one embodiment, the UE 101 is a cell phone, the UD 111 is a car, and one of the sensors 117 measures the level of the gas tank. Accordingly, a message sent in response to a blocked incoming communication could contain the level of gas left in the tank and an estimated time until the gas tank is empty and until the user must stop for gas.

Figure 8:
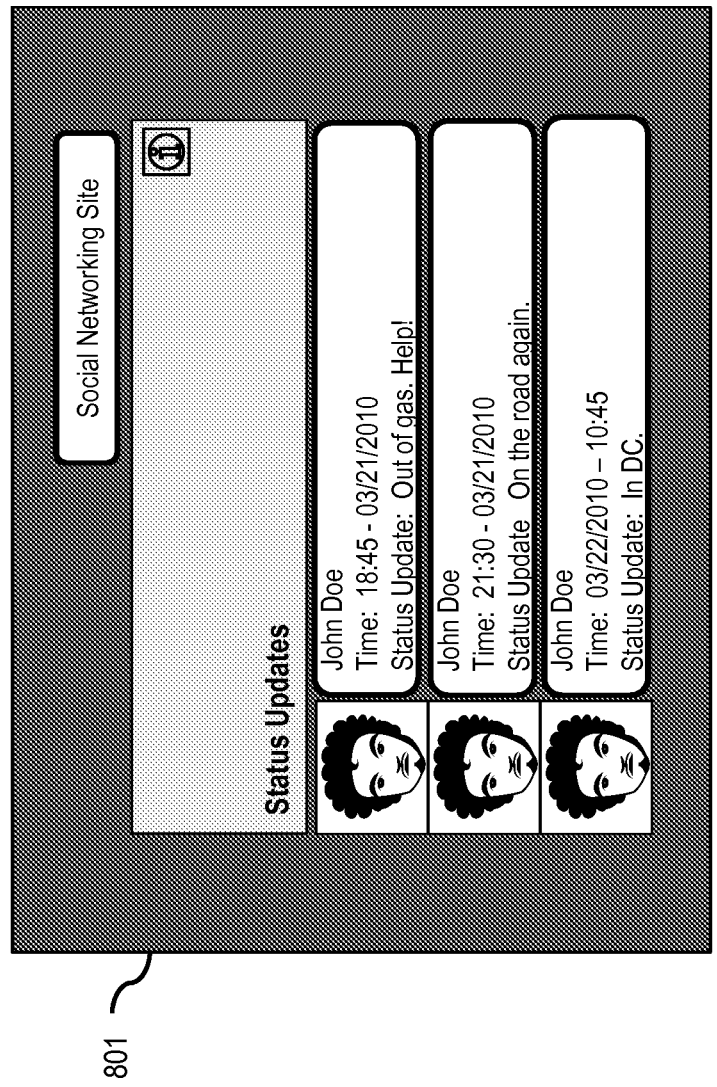
FIG. 8 is a diagram of a user interface utilized in the process of FIG. 3, according to various embodiments.

As discussed above, the DnD platform 121 can also distribute broadcast information that is proactive rather than reactive, i.e., generated and distributed in response to a change in the context information and not necessarily in response to an event of incoming disturbance content. In one embodiment, the DnD platform 121 sends broadcast information to OUE 109 in response to a change in the context information. In which case, the user interface 701 and indicator 703 indicates broadcast information that is proactively sent to the third party rather than in response to the third-party's attempted communication. In another embodiment, the DnD platform 121 sends broadcast information to the services platform 113 in response to a change in context information. In one embodiment, the user is using the UE 101 for running a navigation application 107 with active route guidance. The DnD platform 121 can be configured to generate and distribute broadcast information regarding the user crossing territorial boundaries, passing near certain landmarks, getting closer to an intended destination, etc. In another embodiment, the DnD platform is configured to generate and distribute broadcast information regarding characteristics of the UD 111 associated with the UE 101. For example, FIG. 8 illustrates indicator 801 that displays, for example, information retrieved by a service 103a of the services platform 113. In one embodiment, the indicator 801 indicates the name of a social networking site along with a contact name associated with the user of the UE 101 on the social networking site. In addition to the contact name, the indicator 801 indicates status updates according to date and time. In one embodiment, the DnD platform 121 broadcasts through the UE 101 information regarding the UD 111 associated with the UE 101, such as the UD 111 being out of gas. Further, in a situation where the UE 101 is running a navigation application 107 and a navigation route is active, the DnD platform 121 broadcasts information regarding the navigation route, such as when the user starts again on the navigation route or when the user crosses over territorial boundaries.

Figure 4:
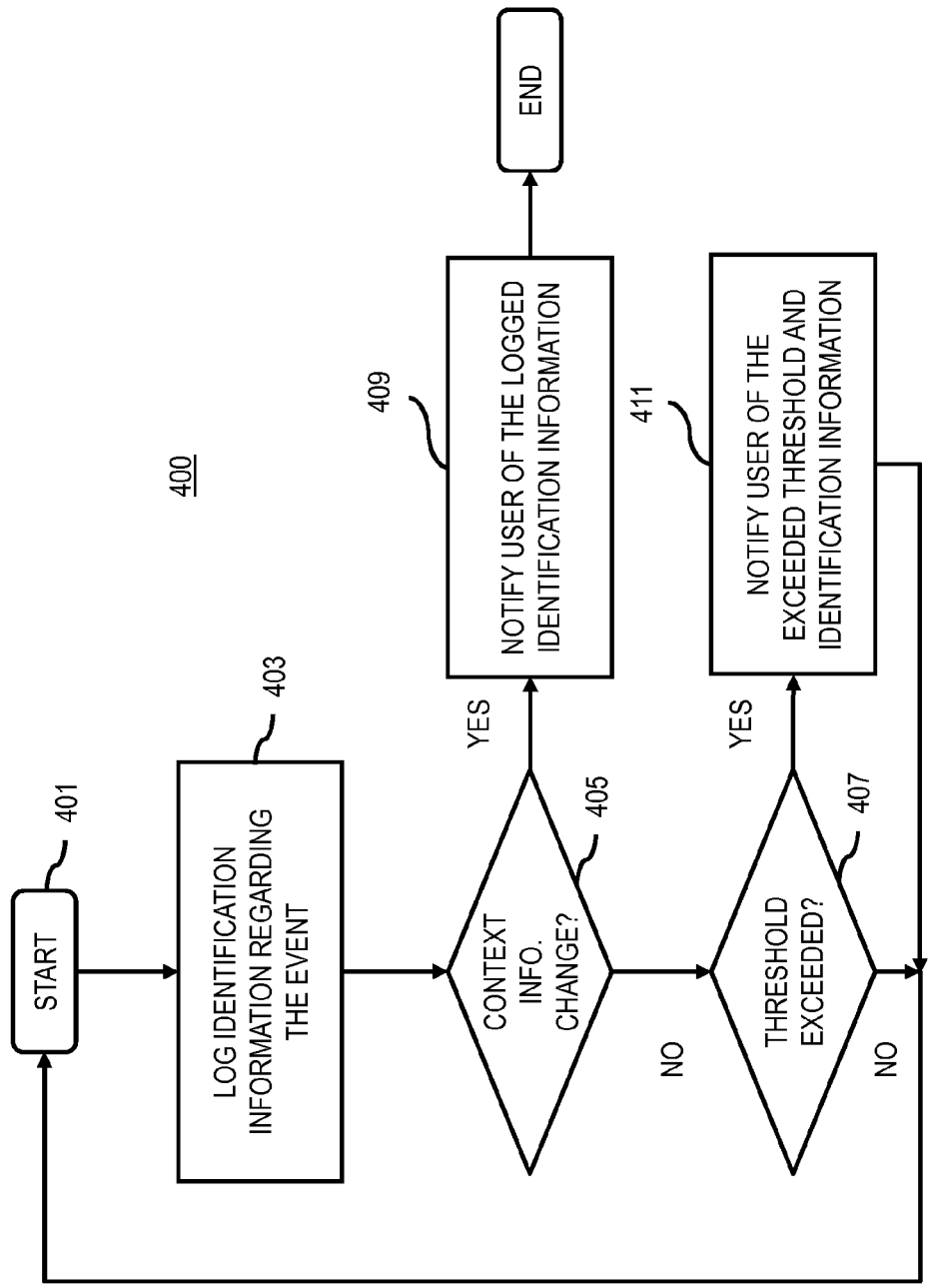
FIG. 4 is a flowchart of a process for handling a disturbance event, according to one embodiment.

FIG. 4 is a flowchart of a process for managing device do-not-disturb operational modes based on context information with logging information, according to one embodiment. In one embodiment, the DnD platform 121 performs the process 400 and is implemented in, for instance, a chip set including a processor and a memory as shown in FIG. 13. The process 400 provides a general overall process for providing managing device do-not-disturb operational modes based on context information and generating logging information of incoming disturbance content, which is discussed in more detail with respect to FIGS. 9-11.

Figure 10:
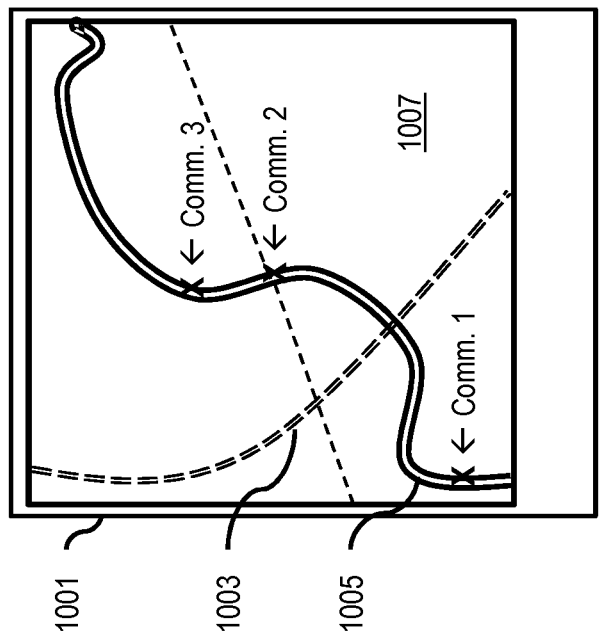
FIG. 10 is a diagram of a user interface utilized in the process of FIG. 4, according to various embodiments.

In step 401, the process 400 starts off after the process 300 determines the occurrence of an event that is blocked or otherwise modified or changed, by the current operational mode of the DnD platform 121. In step 403, the information regarding the event is recorded in the log 211. In one embodiment, where the event is an incoming phone call from a OUE 109, information such as the time, date, party name, type of communication, etc. is logged in the log 211. This allows the user of the UE 101 to quickly and easily understand what events that were blocked, or otherwise modified or changed, occurred while the UE 101 was under a strict operational mode. In one embodiment, the broadcast message sent in response to the logged event is also logged in the log 211. In one embodiment, additional information can be logged in the log 211 such as the context information of the UE 101 or the UD 111. For example, as illustrated in FIG. 10, discussed below, information regarding the location of the UE 101 is logged in the log in the event a navigation application 107 with an active route is running on the UE 101 at the time of the disturbance event. This allows the user of the UE 101 to quickly and easily understand where and when the events that were blocked, or otherwise modified or changed, occurred to better determine how and when to respond to the events.

In step 405, after the information regarding the disturbance event is logged, the DnD platform 121 determines whether the context information has changed and/or whether the operational mode has changed. If there is no change, the process 400 proceeds to step 407. If there is a change, the process 400 proceeds to step 409.

In step 409, if the context information and/or operational mode changed such that the previously blocked events would be no longer blocked, i.e., the DnD platform 121 determines that the previously blocked events do not pose a significant disturbance to the user of the UE 101, the DnD platform 121 notifies the user of the UE 101 of the previously blocked events via the logged information in the log 211. In one embodiment, the DnD platform 121 further notifies the user of the UE 101 of the location of the events, if such information was available to be logged. The user is then able to act on the logged information.

In step 407, despite no change in the context information and/or operational mode, the DnD platform 121 processes the time elapsed since certain logged events that are associated with broadcast information that included estimated time that the user of the UE 101 would be able to respond to the event. In one embodiment, a determination is made of the time elapsed compared to the estimated time the user of the UE 101 was expected to respond and that was broadcasted with the broadcast information. In another embodiment, a determination is made of the time elapsed compared to the estimated time the user of the UE 101 was expected to respond in addition to a threshold amount of time added to the estimated time for a buffer. In one embodiment, where the time elapsed is less than the estimated time, or estimated time plus a threshold, the process 400 reverts back to step 405. Where the time elapsed is greater than the estimated time, or estimated time plus a threshold, the process 400 proceeds to step 411.

In step 411, the DnD platform 121 has determined that the time elapsed since an event for which broadcast information was distributed that included an estimated time has exceeded a designated limit and the DnD platform 121 notifies the user of the blocked event despite no change in the context information and/or operational mode. The DnD platform 121 notifies the user of the UE 101 of the blocked event so that the UE 101 can determine whether to update a third party that potentially caused the blocked event as to why the user of the UE 101 is still unavailable. For example, in one embodiment, the user of the UE 101 is driving in a car using a navigation application 107 with active route guidance and an event by a third party (e.g., phone call) was correctly blocked 30 minutes ago. In response to the event, the DnD platform 121 broadcasted information to the third party regarding an estimated time the user of the UE 101 would be available to return the phone call (for example 30 minutes). Because the estimated time has since elapsed, the DnD platform 121 now notifies the user of the UE 101 of the specific broadcast information sent to the third party and the potential for the need to update the third party regarding why the user has not returned the phone call. After user has been notified of the elapsed time, in one embodiment the process 400 starts over and continues to log events. In another embodiment the DnD 121 platform could automatically change operational modes so that the user of the UE 101 can return the blocked disturbance event.

Figure 9:
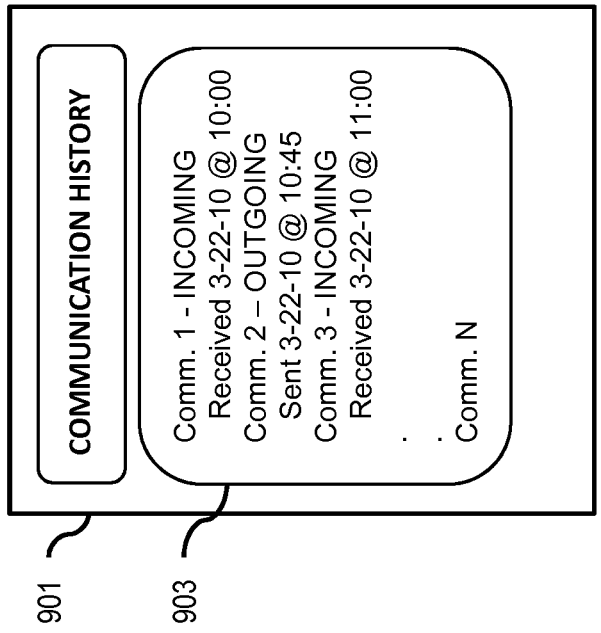
FIG. 9 is a diagram of a user interface utilized in the process of FIG. 4, according to various embodiments.

FIG. 9 is a diagram of a user interface 901 utilized in the process of FIG. 4, according to one embodiment. When the DnD platform 121 disables functions of the application 107 running on the UE 101, the event module 209 logs each blocked disturbance content for later viewing by the user when the DnD platform 121 lowers the do-not-disturb level. In one embodiment, after the DnD 121 platform changes the operational mode from the strictest to the least strict operational mode, assuming incoming communications were blocked, the DnD 121 platform outputs on the user interface 901 a content history indicating what incoming content was blocked. For instance, in the embodiment illustrated in FIG. 9, the user interface 903 displays that communications 1 and 3 were blocked at 10:00 and 11:00, respectively, on Mar. 22, 2010. The indicator 903 can further include the names of the third parties or any other identifying information. The user interface 901 allows the user of the UE 101 to know what third parties attempted to communicate with the user and what other disturbance content was blocked while the UE 101 was in a do-not-disturb operational mode. In one embodiment, the communication history also includes proactive communications sent to third parties (e.g., friends in a contact list, friends associated with the user of the UE 101 on a service 103) based on changes in the context information (e.g., crossing territorial boundaries, running out of gas, having low oil). In one embodiment, the communication history further indicates that there is no communication history that occurred during the activation of the operational modes as a further measure to confirm to the user of the UE 101 that the DnD platform 121 were functioning properly but no communications were received.

FIG. 10 is a diagram of a user interface 1001 utilized in the process of FIG. 4, according to one embodiment. The user interface 1001 illustrates on a map 1007 where along a navigation route 1005 the UE 101 was when disturbance events where blocked and where the UE 101 was when proactive broadcast information was distributed. For example, the user interface 1001 illustrates where communications 1-3 illustrated in user interface 901 in FIG. 9 occurred in relation to the navigation route 1005. As seen in FIG. 10, communication 2 was distributed in response to the UE 101 crossing into a new territorial boundary designated by the dashed single line.

The DnD platform 121 also has the functionality to distinguish between types of navigation appropriate for do-not-disturb modes. Where a navigation route is detected that overlaps a known mass-transport route, such as a bus route or train tracks, this additional context information allows for the DnD platform 121 to distinguish between appropriate operational modes. For example, the user interface 1001 illustrates train tracks 1003. If the UE 101 were to be running an application 107 for navigation guidance that detects the UE 101 traveling along the train tracks 1003, principles in the DnD 121 would determine that a do-not-disturb operational mode is not appropriate despite contrary information from other triggers because the UE 101 is associated with a mass-transport line and the user of the UE 101 is most likely not in a situation that requires no disturbances. In another example, the DnD platform 121 can determine that a more restrictive operational mode is not appropriate where, despite the UE 101 navigation on the navigation route 1005, intermittent stops are detected in the navigation indicating that the UE 101 is associated with another form of mass transportation, such as a bus.

Figure 11:
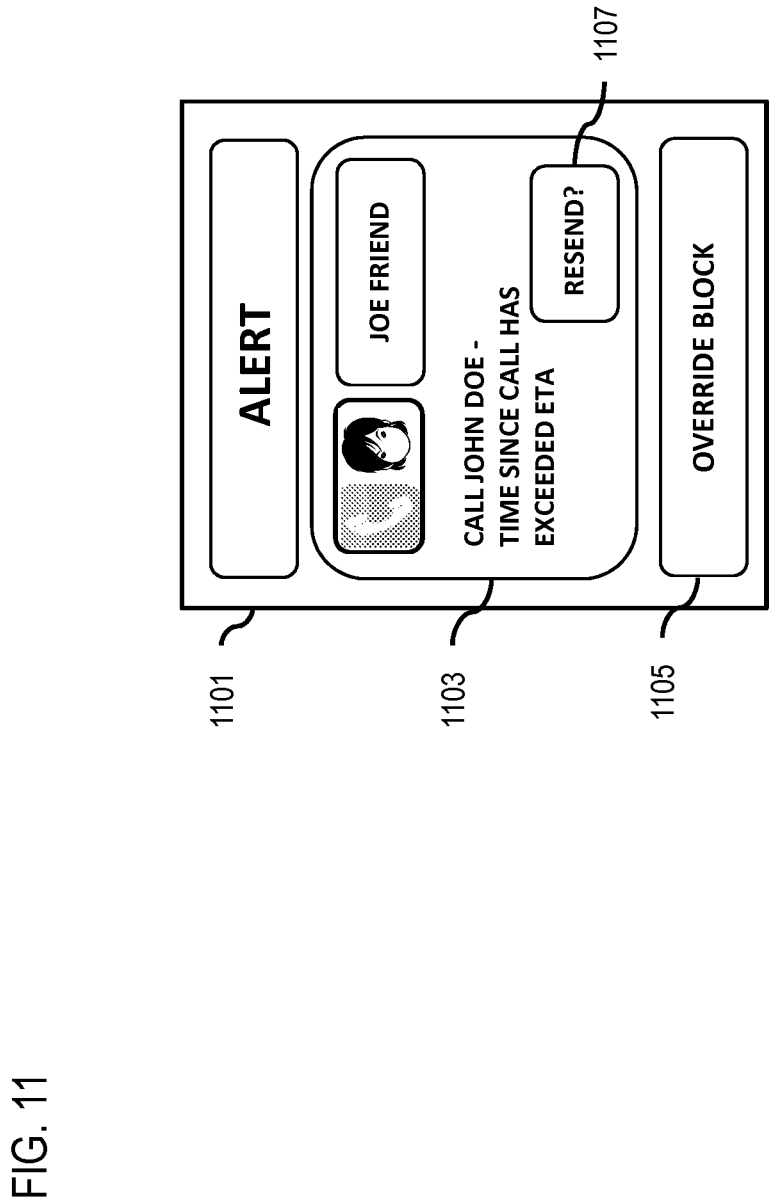
FIG. 11 is a diagram of a user interface utilized in the process of FIG. 4, according to various embodiments.

FIG. 11 is a diagram of a user interface 1101 utilized in the process of FIG. 4, according to one embodiment. As discussed above, broadcast information distributed by the DnD 121 can contain information concerning when third parties can expect the user to return the blocked communication attempts. In one embodiment, there can be a situation where the UE 101 is still in the same operational mode because there is no change in the context information despite the elapsed time since the estimated time to arrival was broadcasted to third parties exceeding the previously broadcasted amount of time. Once the elapsed time has exceeded a threshold level, the user of the UE 101 is notified of the previous disturbance content that generated the broadcast information and that included the estimated time the user of the UE 101 would be available. In one embodiment, the user interface 1101 includes indicator 1103 that includes such information. In one embodiment, the user interface 1101 also includes indicator 1105 that allows the user to override the current operational mode set by the DnD platform 121 to return the previously missed incoming communication. In one embodiment, the user interface 1101 also includes indicator 1107 that allows the user to send out additional broadcast information that can contain, for example, updated information concerning when third parties can expect the user to return the previous blocked communication attempt. Thus, for example, if the user took a 30 minute detour, the DnD platform 121 can send out additional broadcast information that updates the third party on the new estimated the user will be available.

The processes described herein for managing device do-not-disturb operational modes based on context information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
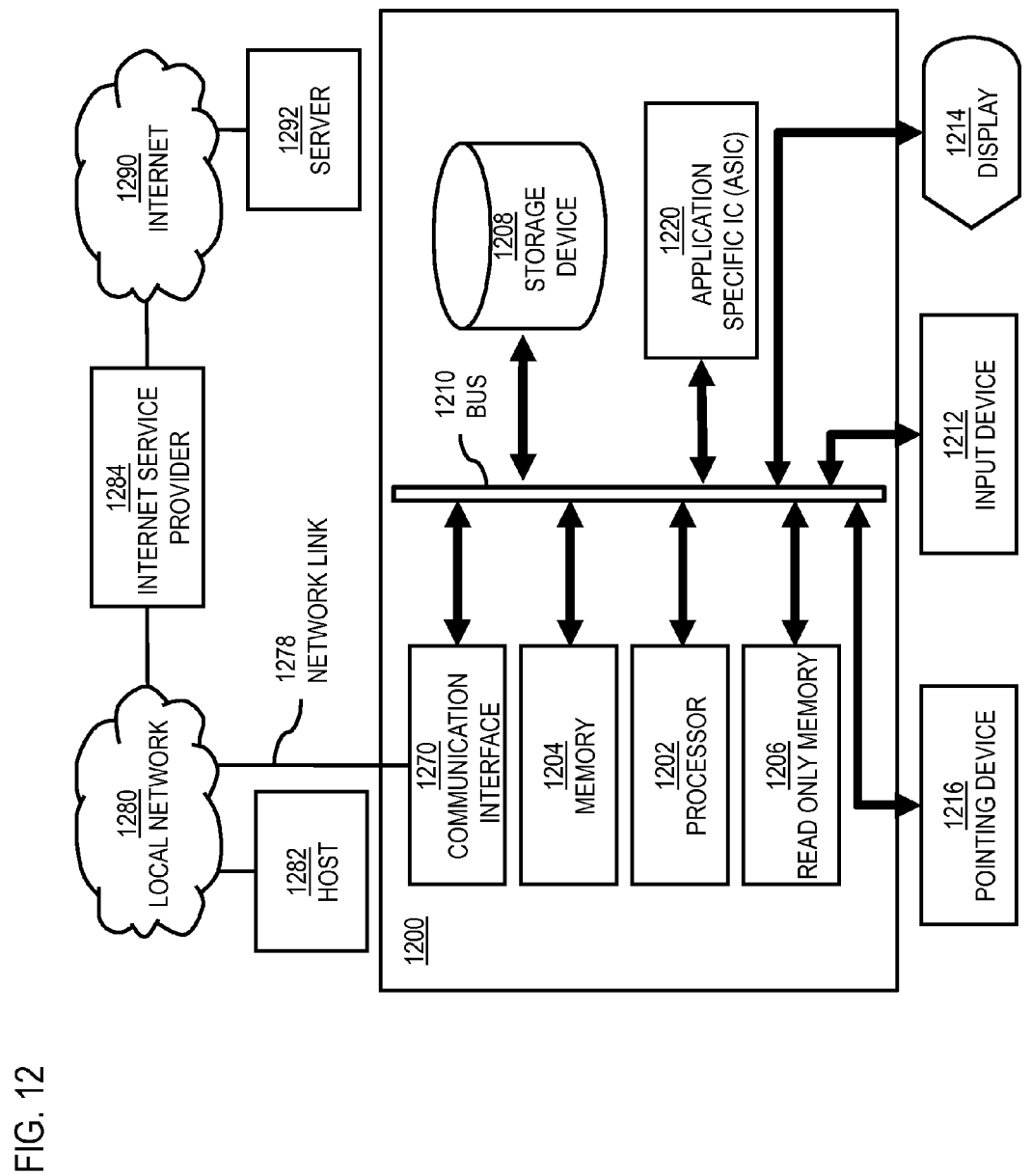
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to manage device do-not-disturb operational modes based on context information as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of managing device do-not-disturb operational modes based on context information.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to managing device do-not-disturb operational modes based on context information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for managing device do-not-disturb operational modes based on context information. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for managing device do-not-disturb operational modes based on context information, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for managing device do-not-disturb operational modes based on context information on the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1292.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to manage device do-not-disturb operational modes based on context information as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of managing device do-not-disturb operational modes based on context information.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to managing device do-not-disturb operational modes based on context information. The memory 1305 also stores the data associated with or generated by the execution of the inventive steps.

Figure 14:
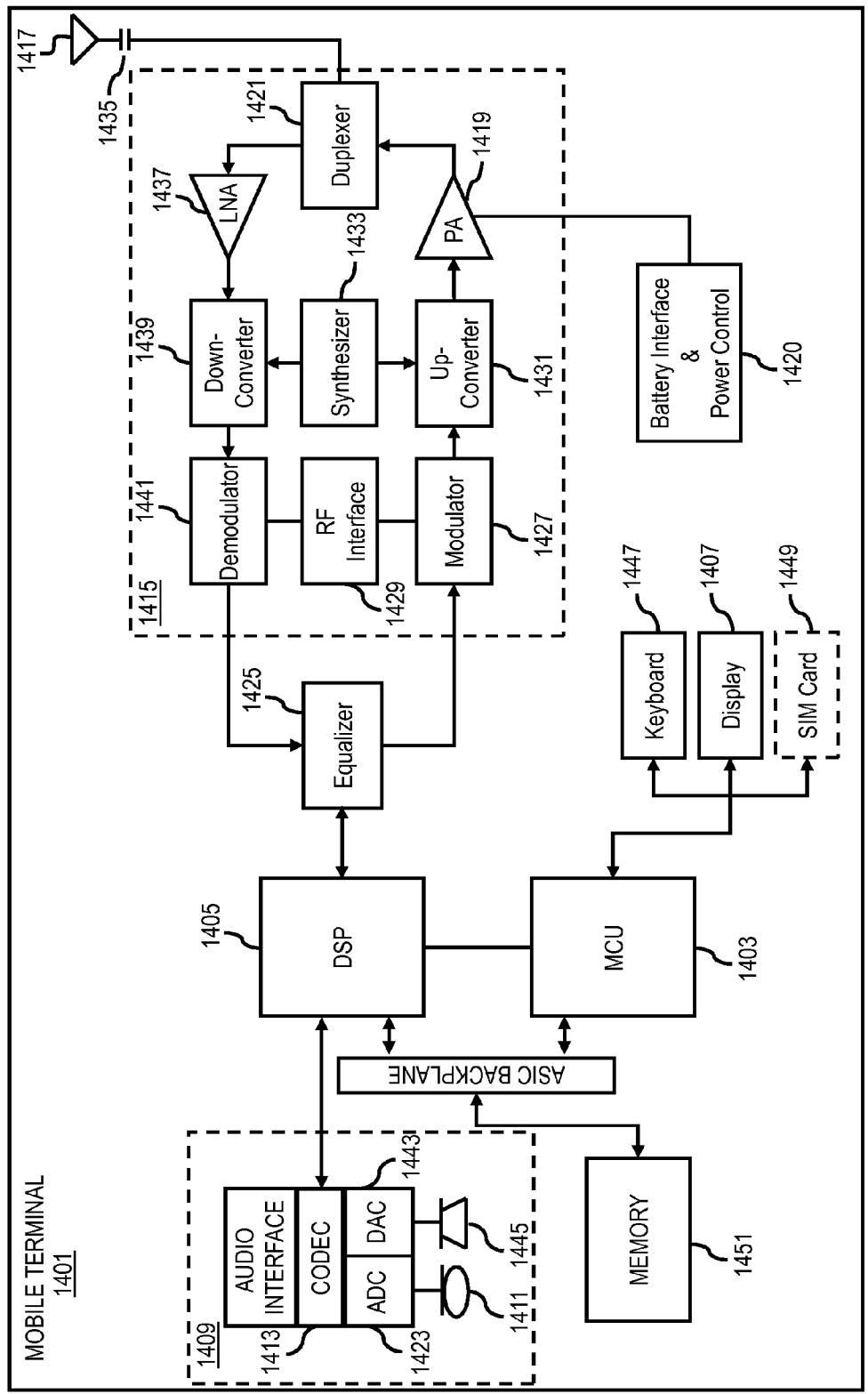
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of managing device do-not-disturb operational modes based on context information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of managing device do-not-disturb operational modes based on context information. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to managing device do-not-disturb operational modes based on context information. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   context information associated with a device, a user of the device, or a combination thereof;
   a processing and/or a facilitating of processing of the context information to cause, at least in part, activation of one or more operational modes of the device;
   a disabling or enabling of one or more functions of one or more applications associated with the device based, at least in part, on the activated one or more operational modes, wherein the disabling or enabling of the one or more functions includes blocking a communication attempt by another party; and
   a generating of broadcast information associated with the device, the user of the device, or the combination thereof based, at least in part, on the activated one or more operational modes, the context information, or a combination thereof,
   wherein the broadcast information contains a threshold amount of time as to when the user is expected to return the blocked communication attempt to the other party, and
   wherein, upon an elapsed time from the broadcast information to the other party exceeding the threshold amount of time, the user is notified of the blocked communication attempt by the other party and an amount of time exceeding the threshold amount of time.

2. A method of claim 1, in the activation of the one or more operational modes, the (1) data and/or (2) information and/or (3) at least one signal are further based, at least in part, on the following:
   specifying at least one device parameter to indicate, at least in part, the one or more operational modes; and
   causing the one or more applications to determine the disabling or enabling of the one or more functions based, at least in part, on the at least one device parameter.

3. A method of claim 1, wherein the (1) data and/or (2) information and/or (3) at least one signal are further based, at least in part, on the following:
   a monitoring of the context information; and
   a processing and/or facilitating a processing of the monitoring to determine one or more updates to the context information,
   wherein the activation of the one or more operational modes is based, at least in part, on the one or more updates.

4. A method of claim 1, wherein the (1) data and/or (2) information and/or (3) at least one signal are further based, at least in part, on the following:
   the context information being based, at least in part, on one or more triggers associated with the device, with one or more other devices associated with device, or a combination thereof; and
   a processing and/or facilitating a processing of the context information includes a processing and/or facilitating a processing of the triggers compared to principles to determine at least one score,
   wherein the activation of the one or more operational modes is based, at least in part, on the at least one score.

5. A method of claim 4,
   wherein an amount of the disabling or enabling of the one or more functions of the one or more applications associated with the device is based, at least in part, on the at least one score.

6. A method of claim 4,
   wherein the one or more triggers are associated with one or environmental parameters, user parameters, device parameters, other device parameters, and/or applications parameters.

7. A method of claim 1, wherein the (1) data and/or (2) information and/or (3) at least one signal are further based, at least in part, on the following:
   a monitoring of the context information;

a processing and/or facilitating a processing of the monitoring to determine one or more updates to the context information; and a generating of broadcast information associated with the device, the user of the device, or the combination thereof based, at least in part, on the one or more updates to the context information.

8. A method of claim 1, wherein the (1) data and/or (2) information and/or (3) at least one signal are further based, at least in part, on the following:

a detecting of one or more events associated with the device, the user of the device, or a combination thereof;

a processing and/or facilitating a processing to determine if the one or more events are enabled or disabled based on the activated one or more operational modes; and a logging of identification information associated with the one or more events based, at least in part, on the activated one or more operational modes.

9. A method of claim 8, wherein the (1) data and/or (2) information and/or (3) at least one signal are further based, at least in part, on the following:

a generating of one or more notifications of the identification information associated with the one or more events upon a change in the activated one or more operational modes.

10. An apparatus comprising:

at least one processor; and at least one memory including computer program code, the at least one memory and the computer program code configured to, with the at least one processor, cause the apparatus to perform at least the following, determine context information associated with a device, a user of the device, or a combination thereof;

process and/or facilitate a processing of the context information to cause, at least in part, activation of one or more operational modes of the device;

cause, at least in part, a disabling or enabling of one or more functions of one or more applications associated with the device based, at least in part, on the activated one or more operational modes, wherein the disabling or enabling of the one or more functions includes blocking a communication attempt by another party; and cause, at least in part, a generating of broadcast information associated with the device, the user of the device, or the combination thereof based, at least in part, on the activated one or more operational modes, the context information, or a combination thereof, wherein the broadcast information contains a threshold amount of time as to when the user is expected to return the blocked communication attempt to the other party, and wherein, upon an elapsed time from the broadcast information to the other party exceeding the threshold amount of time, the user is notified of the blocked communication attempt by the other party and an amount of time exceeding the threshold amount of time.

11. An apparatus of claim 10, in the activation of the one or more operational modes, the apparatus is further caused to:

cause, at least in part, a specification of at least one device parameter to indicate, at least in part, the one or more operational modes; and cause, at least in part, the one or more applications to determine the disabling or enabling of the one or more functions based, at least in part, on the at least one device parameter.

12. An apparatus of claim 10, wherein the apparatus is further caused to:

cause, at least in part, a monitoring of the context information; and process and/or facilitate a processing of the monitoring to determine one or more updates to the context information, wherein the activation of the one or more operational modes is based, at least in part, on the one or more updates.

13. An apparatus of claim 10, wherein the apparatus is further caused to:

determine the context information based, at least in part, on one or more triggers associated with the device, with one or more other devices associated with device, or a combination thereof; and process and/or facilitate a processing of the context information to process and/or facilitate a processing of the triggers compared to principles to determine at least one score, wherein the activation of the one or more operational modes is based, at least in part, on the at least one score.

14. An apparatus of claim 13, wherein an amount of the disabling or enabling of the one or more functions of the one or more applications associated with the device is based, at least in part, on the at least one score.

15. An apparatus of claim 13, wherein the one or more triggers are associated with one or environmental parameters, user parameters, device parameters, other device parameters, and/or applications parameters.

16. An apparatus of claim 10, wherein the apparatus is further caused to:

cause, at least in part, a monitoring of the context information;

process and/or facilitate a processing of the monitoring to determine one or more updates to the context information; and cause, at least in part, a generating of broadcast information associated with the device, the user of the device, or the combination thereof based, at least in part, on the one or more updates to the context information.

17. An apparatus of claim 10, wherein the apparatus is further caused to:

cause, at least in part, a detecting of one or more events associated with the device, the user of the device, or a combination thereof;

process and/or facilitate a processing to determine if the one or more events are enabled or disabled based on the activated one or more operational modes; and cause a logging of identification information associated with the one or more events based, at least in part, on the activated one or more operational modes.

18. An apparatus of claim 17, wherein the apparatus is further caused to:

cause, at least in part, a generating of one or more notifications of the identification information associated with the one or more events upon a change in the activated one or more operational modes.

* * * * *